US007932621B1

(12) United States Patent
Spellman

(10) Patent No.: US 7,932,621 B1
(45) Date of Patent: Apr. 26, 2011

(54) METHOD AND APPARATUS FOR AN INTEGRATED WIND-SOLAR ENERGY SYSTEM UTILIZING AN EXISTING WIND TURBINE INFRASTRUCTURE

(76) Inventor: James Patrick Spellman, Dallas, TX (US)

(*) Notice: Subject to any disclaimer, the term of this patent is extended or adjusted under 35 U.S.C. 154(b) by 0 days.

(21) Appl. No.: 12/661,713

(22) Filed: Mar. 23, 2010

Related U.S. Application Data

(60) Provisional application No. 61/299,020, filed on Jan. 28, 2010.

(51) Int. Cl.
*H02J 3/02* (2006.01)
(52) U.S. Cl. ............................................. 307/2
(58) Field of Classification Search ................. 307/2
See application file for complete search history.

(56) References Cited

U.S. PATENT DOCUMENTS

| 5,852,353 | A  | * | 12/1998 | Kochanneck | ............ | 318/558 |
| 6,369,463 | B1 | * | 4/2002 | Maiorano | ............ | 307/66 |
| 2009/0152947 | A1 | * | 6/2009 | Wang | ............ | 307/24 |

* cited by examiner

*Primary Examiner* — Robert L. DeBeradinis
(74) *Attorney, Agent, or Firm* — M. Ahmad

(57) ABSTRACT

The present invention provides a process and apparatus for an integrated wind-solar energy system utilizing an existing wind turbine infrastructure. This invention utilizes unused vertical space of an existing wind turbine steel support tower, and does not use the restricted ground around the wind turbine farm. Additionally, this invention uses the same electrical infrastructure as used for the wind turbine system. This invention provides a significant cost savings over other approaches. The present invention relates to a wind turbine support tower mounted solar system to increase the net electrical output using the existing wind turbine electrical circuits and transmission grid connection. The wind turbine energy support tower mounted solar array, pointed due South, provides about 25 KW of electrical energy per tower either as a Direct Current (DC) feed, or through an Alternate Current (AC) feed matching the wind turbine generator output needs, or directly to the wind turbine tower step-up transformer.

15 Claims, 3 Drawing Sheets

METHOD AND APPARATUS FOR AN INTEGRATED WIND-SOLAR ENERGY SYSTEM UTILIZING AN EXISTING WIND TURBINE INFRASTRUCTURE

CROSS-REFERENCE TO RELATED APPLICATIONS

Application No. 61/299,020 (Provisional); dated: Jan. 28, 2010

STATEMENT REGARDING FEDERALLY SPONSORED RESEARCH OR DEVELOPMENT

Not applicable.

BACKGROUND

1. Technical Field

The present invention relates generally to the field of renewable energy. Still more particularly, the illustrative embodiments are directed to an integrated process and apparatus for an integrated wind-solar energy system utilizing an existing wind turbine infrastructure.

2. Background

A wind turbine as a source of renewable energy in the form of electricity is attractive. However, the wind turbine has drawbacks that at times it is not able to produce sufficient energy due to insufficient wind velocity to drive the turbine blades. Since wind energy is unreliable, the capacity factor for most wind turbine farms in the United States is less than 40%. The wind turbine farm has clusters of wind turbines that are isolated from each other, and each cluster experiences a slightly different wind speed and turbulence. A typical 100 Mega Watt (MW) wind turbine farm will generate less than 20 MW during the summer months in a critical afternoon peak demand energy period. This problem currently exists for the 8000+ MWs of wind turbines in West Texas, which has the largest concentration of wind turbine energy production in the United States.

Solar energy appears to be a solution to the reduced output of wind turbine energy during the daytime. The solar energy is available for about 6 hours per day during the late morning to late afternoon hours. It is known that solar energy tends to provide maximum output energy during the summer months, and the least during the winter months, just the opposite of wind turbine energy. The problem with the normal isolated solar energy array system is that it requires hundreds of acres of relatively flat level land with a completely independent and fully integrated generation infrastructure, which includes a manned facility with a control building, control system, multiple inverters and combiners, one or more step up transformers, switchgear, substation and a special access transmission tie line to the nearest transmission grid.

Presently, solar energy resources may be allocated to a transmission grid in a way that is not fully integrated because solar energy is not considered a reliable source of energy. The solar energy farm array limited energy availability requires special transmission grid management to handle the sudden onset and reduction of a block of solar energy to the transmission grid. The availability of solar energy is limited due to the reason that solar energy is only generated when the sun is shining.

The wind energy farms are usually located on private land or ranches and typically utilize irregular terrains, which usually are the locations of the best wind velocities. A typical wind energy farm is usually a cluster of wind turbines on various hills. The land around the wind turbine includes a network of towers, access roads, underground electrical conduits, possibly the rancher's cattle, and most certainly the wild animals. A large segment of the ground area around the wind turbine tower is for the equipment, lay down areas for maintenance, access for the large tower cranes needed for rotor blade, and power train removal and replacements. This invention effectively supplements the energy produced by a wind turbine and overcomes the lack of land space around a wind turbine farm or individual wind turbine by providing a method and system for an integrated wind-solar system utilizing an exiting wind turbine infrastructure, as no separate solar energy array land space is required. This tower mounted Photovoltaic (PV) solar array actually protects the solar panels from physical damage. This invention also avoids the grid integration requirements normal to a solar energy array farm, because it only represents a small percentage (about 25 KW vs. 1.5-2.5 MW nameplate of the connected wind turbine) of the actual wind turbine energy output under normal conditions.

SUMMARY OF THE INVENTION

This Invention is unique as it utilizes the unused vertical space of the existing wind turbine steel support tower and does not use the restricted land around the wind turbine farm. Additionally, it uses the same electrical infrastructure as the wind turbine. Therefore, this invention provides a significant cost savings over the other approaches. The PV solar panels may be configured either in the horizontal plane, or in the vertical plane, or in combination of the vertical and horizontal planes to increase the total number and output of additional solar energy panels. While the wind turbine steel support towers are usually a few hundred feet apart, it may be possible to route the outputs of few tower mounted PV solar energy array underground to one wind turbine down tower electric infrastructure to save the equipment and installation costs.

This invention effectively supplements the electrical energy produced by a wind turbine with solar energy and overcomes the lack of land space around a wind turbine farm or an individual wind turbine tower by providing a method and apparatus for an integrated wind-solar energy system utilizing an exiting wind turbine infrastructure. As this invention utilizes an existing wind turbine tower infrastructure, no separate solar energy array land space is required. Not only the solar energy array is installed on a pre-existing wind turbine tower, pre-existing energy conversion and processing devices which are part of the pre-existing wind turbine tower infrastructure may also be commonly used, both for the wind turbine and as well as for the added solar energy system. This integration is equally applicable to a pre-existing, or to a new installation.

In view of the foregoing, it is an object of the present invention to provide a method and system for an integrated wind-solar system utilizing an exiting wind turbine infrastructure.

It is another objective of the present invention to provide an integrated wind-solar energy system utilizing an exiting wind turbine infrastructure including a wind turbine steel support tower about 400 feet in height.

It is another objective of the present invention to provide an integrated wind-solar energy system utilizing an exiting wind turbine infrastructure including a wind turbine steel support tower on land, and offshore.

It is another objective of the present invention to provide an integrated wind-solar energy system utilizing an exiting wind turbine infrastructure where the PV array is mounted on racks, and the racks are installed on a pre-existing wind turbine steel support tower, vertically, horizontally, or in combination of the both.

It is another objective of the present invention to provide an integrated wind-solar energy system utilizing an exiting wind turbine infrastructure including an automated, or a manual tilt and rotation system for the solar module or panel.

It is another objective of the present invention to provide an integrated wind-solar energy system utilizing an exiting wind turbine infrastructure, where the solar energy generated is routed via electric circuitry to the existing wind turbine, down tower or up tower, electrical system, where the energy is connected to the existing wind turbine electrical infrastructure, and the step up transformer. This configuration eliminates the need for a separate ground level solar energy array generating plant infrastructure at a distant site. Note: this invention generates power only when the sun is shining. Higher elevations wind turbine farms benefit from greater irradiance (sunlight energy) and provide an increase in the total solar energy output.

As discussed previously, the newly disclosed method and apparatus overcomes the disadvantages inherent in the prior art pertaining to the wind turbine energy source by integrating a wind-solar energy system using an existing wind turbine infrastructure. It is to be understood that this disclosure is not limited in its details of construction. Also, it is to be understood that phraseology and terminology employed herein are for the purpose of description and should not be regarded as limiting.

Accordingly, those skilled in the art will appreciate that the concept upon which this invention is based may readily be utilized for the design of other systems or devices for carrying out the purposes of this present invention. Therefore, it should also be realized by those skilled in the art that such equivalent constructions do not depart from the spirit and scope of the disclosure as set forth in the appended claims.

DETAILED DESCRIPTION OF THE DRAWINGS

The numerous innovative teachings of present application will be described with particular reference to presently preferred embodiments. Note: A number of Wind Turbine manufactures and each utilizes a different down tower electrical configuration that requires coordination with the specific manufacturer. This invention uses a number of electrical devices to match the operational requirements of each wind turbine manufacturer, but other devices not disclosed may be required and are considered part of this invention.

Figure 1:
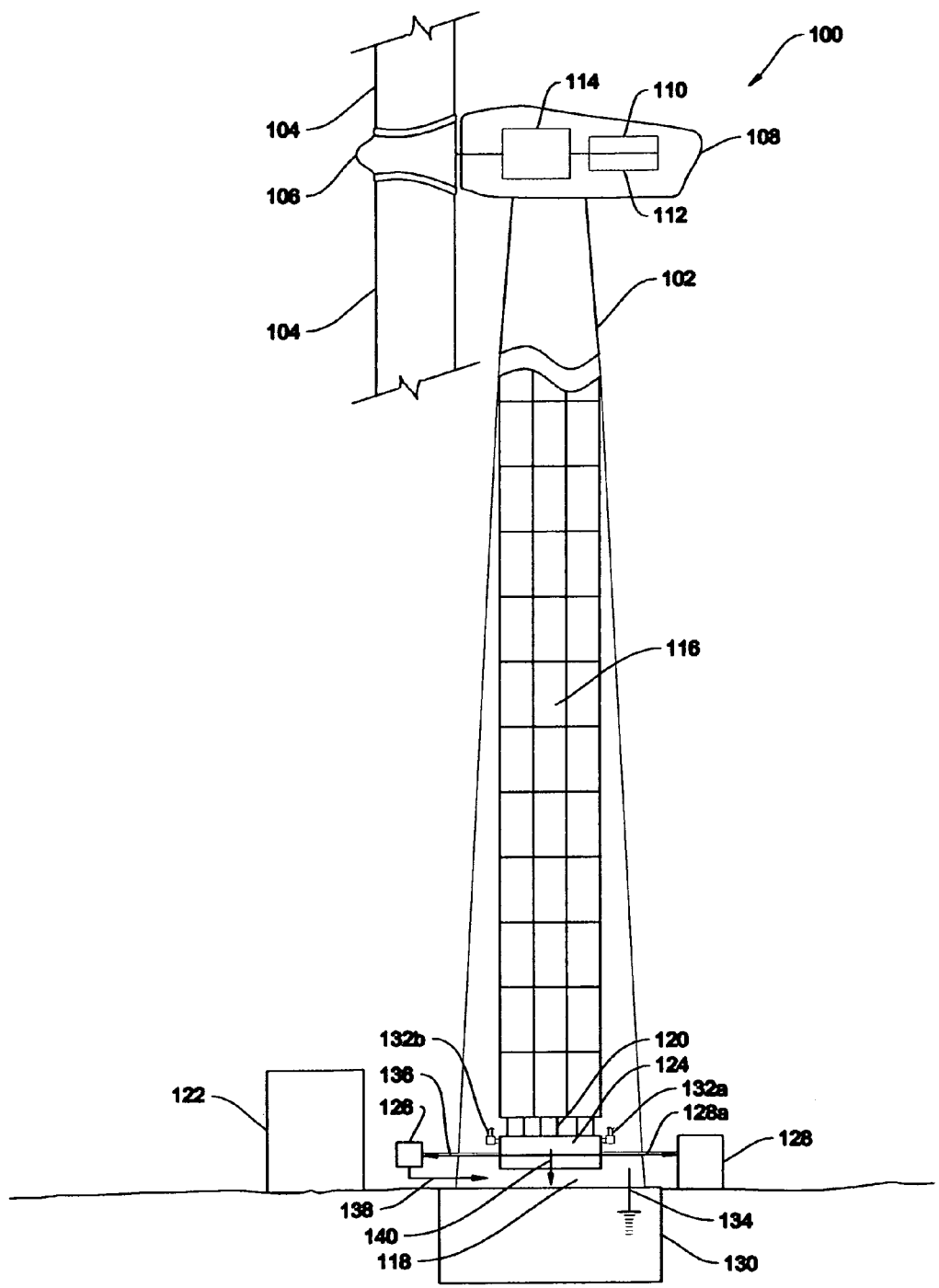
FIG. 1 shows a view of an integrated wind-solar energy system utilizing an existing wind turbine infrastructure.

Referring to drawings, FIG. 1 shows a comprehensive view of the integrated wind-solar energy system utilizing existing wind turbine steel support tower infrastructure 100. A typical height of an integrated wind-solar energy system tower 102 utilizing an existing wind turbine steel support infrastructure 100 is about 400 feet in height. The integrated wind-solar energy system utilizing an existing wind turbine steel support tower infrastructure 100 set up illustrates a plurality of wind turbine blades (typically three blades) 104, and a rotor hub 106. A typical span of wind turbine blade 104 is about 200 feet. An up tower 108 includes a generator 110, a control panel 112, and a gear box 114. A PV solar module array 116 includes about one hundred eight (108) solar modules which are configured into panels. Each module is about 15% efficient and is rated at about 235 Watts. The PV solar module array 116 is based on about one hundred eight (108) solar modules per array 116; each rated at about 235 Watt, and is arranged in nine series circuits of twelve modules each. Presently, in most cases, additional panels may be required if the thin film modules are fabricated from a less efficient material.

In one embodiment, this invention utilizes about one hundred eight (108) solar modules per array 116. The integrated wind-solar energy system utilizing an existing wind turbine steel support tower infrastructure 100 further includes down tower electrics 118 (internal components not shown in FIG. 1, refer to 232 in FIG. 2), and a wind turbine tower step up transformer 122, conduit wire leads 120 from array 116 routed to a combiner box 124, a DC voltage regulator 126, an inverter (DC-AC) 128, a foundation 130, conduit risers 132a-132b for some of the upper circuits of the array 116, a tower grounding common grid connection 134 for the wind-solar system 100, a connection 136 from the combiner box 124 to the DC voltage regulator 126, a connection 138 from the DC voltage regulator 126 to the wind tower internal electrics 118, and a connection 140 from the combiner box 124 to the tower internal electrics 118, and from the combiner box 124 to 128a to DC-AC inverter 128, and from 128 to internal electrics 118 either directly or through a step up transformer (not shown in FIG. 1). Additional components used in the integrated wind-solar energy system (not shown in FIG. 1) includes: combiner internal wiring, fuses, bus, charge controller, electric meter, circuit breaker, DC negative to the ground, and equipment ground wire. Note: The components and circuits external to the wind turbine tower electrics 118, and wind tower step up transformer 122 are designed in accordance with the National Electric Code (NEC), Article 690 Solar Photovoltaic System standards.

Referring again to FIG. 1, in one embodiment, the present invention increases the net electrical output using the existing wind turbine electrical circuits and ground grid connection 134. Note: The solar panels on racks (not shown in FIG. 1) are directly installed on the wind turbine steel support tower 102. The wind energy steel support tower mounted solar array 116 pointed due south or southwest provides about 25 KW of electrical energy per tower using the existing wind turbine electrical system infrastructure either as a direct current (DC) feed, or through an alternating current (AC) feed that matches the wind turbine output needs in the down tower electrics 118, or directly to the wind tower step up transformer 122 next to the integrated wind-solar energy system tower 102. The DC electrical energy, either directly to connection 140, or through a DC voltage regulator 126, or through a DC-AC inverter 128, and alternately to a charge controller (not shown in FIG. 1) is routed to the wind turbine down tower electrics 118. The AC electric energy may be routed to the down tower 118 AC electrics directly, or to the wind turbine step up transformer 122. The final size of the PV wind-solar array 116 is determined using different solar module ratings, or by increasing the total number of solar modules (not shown in FIG. 1) installed.

Referring again to FIG. 1, in another embodiment, various types of charge controllers (not shown in FIG. 1) may be used depending on the task to be accomplished. For example, Diversion, Linear Current or Maximum Power Tracking type charge controllers, depending on the wind turbine electrical requirements may be used, and the charge controller comply with UL 1741 standard. The PV wind-solar panel tilt angle and rotation system (not Shown in FIG. 1) may be employed to follow the sun across the horizon, and to change the angle with these seasonal angles of the sun to increase the average yearly output about 20-30%. Additional junction boxes for cable termination, testing and maintenance, DC and AC panels for instruments, circuit breakers, capacitors, and over current protection devices may be included in the integrated wind-solar system 100. The grounding 134 for the non-current carrying equipment is installed to tie all the module frames, mounting racks, junction boxes (if used), combiner box, charge controller, inverter, circuit breakers enclosure, meter boxes, ground block, and any other devices used for the wind turbine tower ground system (shown or not shown in FIG. 1). Note: The DC voltage regulator, the charge controller (not shown in FIG. 1), and the inverter 128 are equipped with the circuit breakers. The DC-AC inverter 128 meets UL Standard 1741, IEEE929-2000. The inverter 128 is internally self regulating, and prevents the reverse current flow. The circuit breakers used are DC or AC rated for this invention. The circuit breakers to open under load have voltage and current rating per NEC 690 standard. A grounding system 134 complies with NEC 690. Note: the solar panels on racks (not shown in FIG. 1) are directly installed on the wind turbine steel support tower 102.

Figure 2:
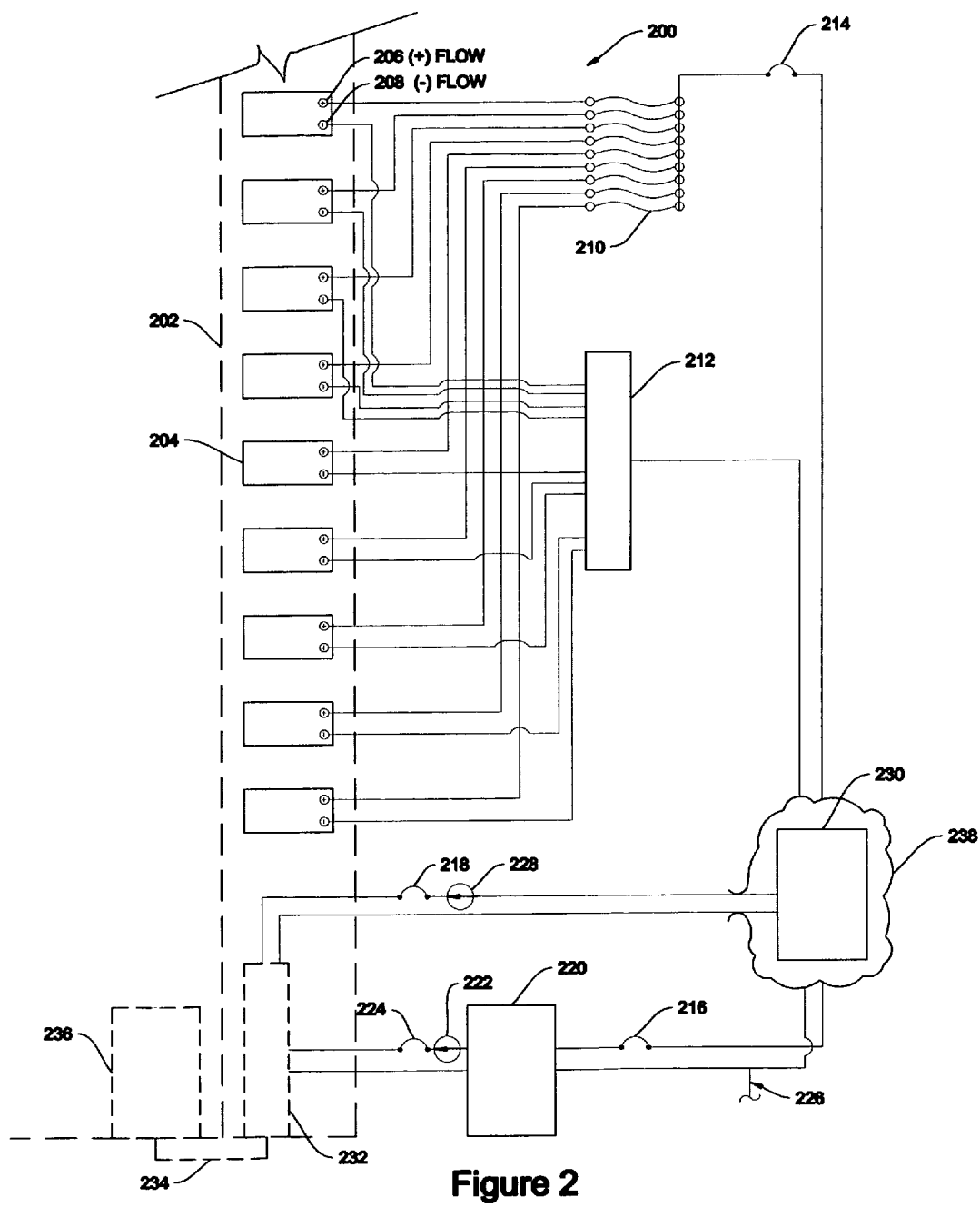
FIG. 2 shows a Photovoltaic (PV) nine circuit consolidated set up for an integrated wind-solar energy system utilizing an existing wind turbine infrastructure.

FIG. 2 shows an embodiment of a plurality of Photovoltaic (PV) consolidated circuits set up for an integrated wind-solar energy system utilizing an existing wind-solar turbine infrastructure 200. The wind-solar turbine infrastructure 200 comprises a wind-solar turbine tower 202, a nine circuit consolidated array 204 is shown as one panel each. When connected in series, the voltage of each module is added and the current remains at the single module rating until connected together in the combiner box DC negative bus 212. The enclosure for the combiner box 124 in FIG. 1 is not shown for clarity of FIG. 2. Each of the twelve series modules are interconnected with a Multi-Contact Locking Connector (MC4), not shown in FIG. 2. Note: an array 204 comprises modules and panels. The one hundred and eight (108) PV solar modules are mounted on to racks and the racks are secured to the wind turbine steel support tower 202, and the modules comply with UL 1703 standard. The total of one hundred and eight (108) PV solar module or nine separate PV solar circuits 204 represent a target of 25 KW input to each wind turbine tower electric system 200. The variation in voltage and total energy KW is accomplished by selecting the PV module Wattage rating and the number of modules. The 25 KW, PV solar array 204 may require a wind turbine tower height of about at least 200 feet. The PV solar array 204 efficiency is affected by the incident angle of panels to the sun. The PV solar panels may also be mounted horizontally around the contour of the support tower 202. This allows for a greater number of panels to be used to increase the total solar energy output. Also, behind the rotor blade sweep on the wind turbine support tower 202, the panels may have an orientation (vertical or horizontal) and below the blade sweep (blades 104 in FIG. 1), or a combination of the both. The panel tilt angle to the sun (not shown in FIG. 2) may also vary behind and below the rotor blade sweep. The safe rotor blade rotation deflection clearance is maintained between the blade and the wind turbine steel support tower 202 and the rack mounted solar array 204.

Referring again to FIG. 2, fuse holders 210 are illustrated for the nine circuits 204 with the positive DC leads 206 to the fuse holders 210 and the negative DC leads 208 to the DC bus 212. The Combiner outlet circuit is routed via DC connect to a full sine wave DC-AC inverter 220 for the utility interactive mode that meets the IEEE standard 929-2000 and UL 1741, which is sized at 30 KW (using DC circuit breakers 214, 216, an AC circuit breaker 224 which is rated for the DC-AC inverter 220 output, and an AC KWH meter 222. Generally, all wind turbines have DC or battery needs for control circuits. Depending on the set up, both DC energy through a charge controller 230 (superimposed that meets the UL 1741 and IEEE 929-2000 standards), and a DC-AC inverter 220 may be utilized. The charge controller 230 includes a DC KWH meter 228, a DC circuit breaker 218. The DC negative to the ground 228 through a ground block (not shown in FIG. 2) terminates at the integrate wind-solar turbine tower 134 common ground grid, as shown in FIG. 1. The final AC flow from the underground AC feed 234 from the wind-solar turbine down tower electrics 232 to the wind turbine tower step up transformer 236. The DC voltage regulator 126 is not shown in FIG. 2.

Figure 3:
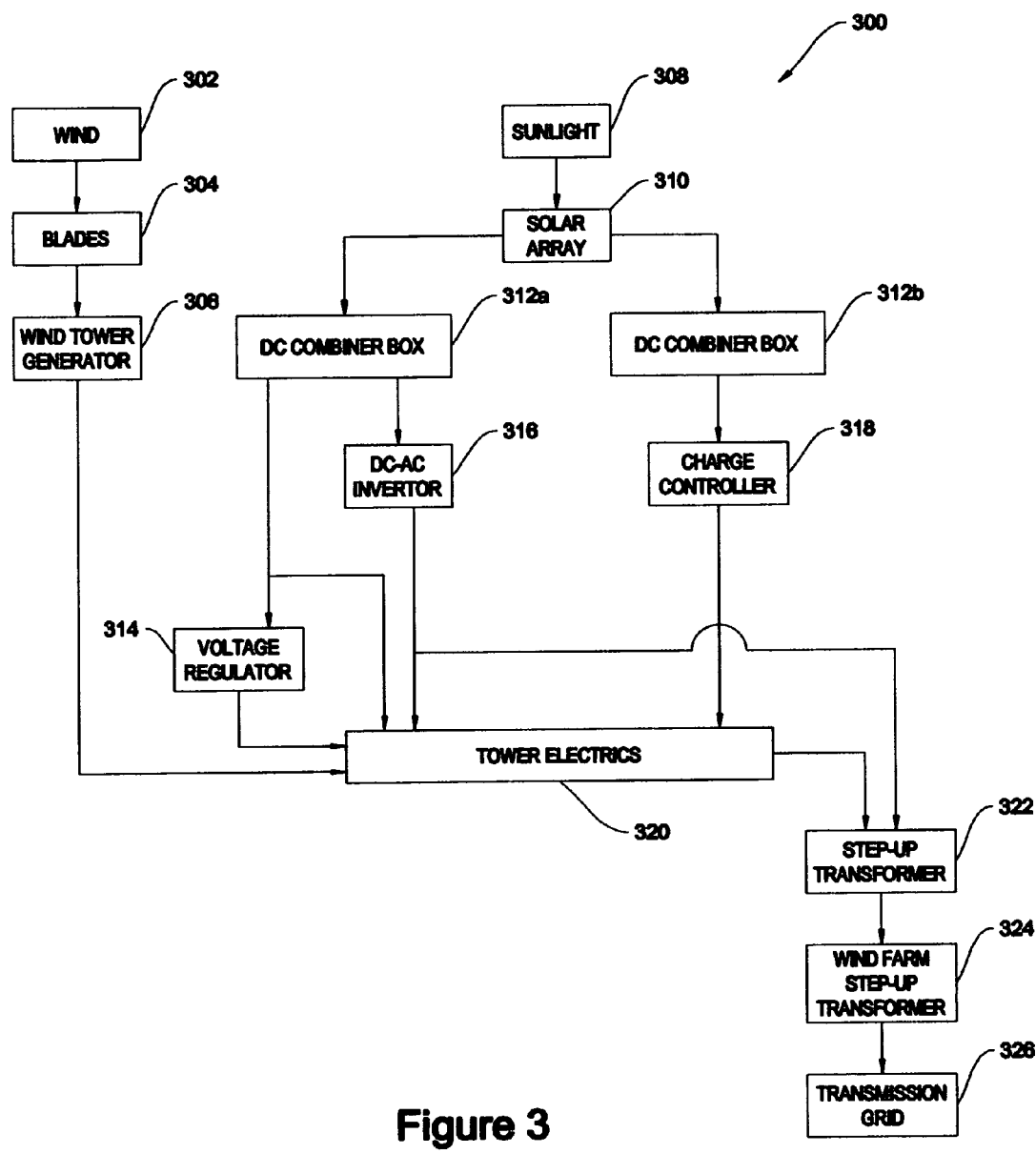
FIG. 3 shows a process flow diagram for an integrated wind-solar energy system utilizing an existing wind turbine infrastructure.

Referring to drawings, FIG. 3 shows a process flow diagram of the integrated wind-solar energy system utilizing an existing wind turbine infrastructure 300. The existing wind turbine infrastructure 300 includes the wind 302, a plurality of turbine blades 304, and a wind tower generator 306. The energy processed by the wind tower generator 306 is directed to the wind turbine tower electrics 320, and the electrical energy from the tower electrics 320 is routed to a tower step up transformer 322, and from the wind turbine tower step up transformer 322, the electrical energy is then routed to the main wind farm step up transformer 324, and from step up transformer 324 to a transmission grid 326.

Referring again to FIG. 3, the process flow diagram 300 depicting that the sunlight 308 is directed to a solar array 310. The array 310 comprises a plurality of monocrystalline silicon Photovoltaic (PV) modules and panels mounted on to a plurality of racks, and the plurality of racks (not shown in the flow diagram 3) are secured on a solar-wind turbine steel support tower as shown in FIG. 1.

Referring again to FIG. 3, in one embodiment of the present invention, the electrical energy from the solar array 310 is routed to a Direct Current (DC) combiner box 312a, and from the DC combiner box 312a to a DC voltage regulator 314. The electrical energy from the DC voltage regulator 314 is then routed to the wind turbine electrics 320, and from the wind turbine electrics 320 to the wind turbine tower step up transformer 322, and from the wind turbine tower step up transformer 322, the electrical energy is routed to the main wind farm step up transformer 324, and then from the main wind farm step up transformer 324 to a transmission grid 326. In the same embodiment, the electric energy form the DC combiner box 312a may be directly routed to the wind turbine electrics 320, by-passing the DC voltage regulator 314. Note: The wind turbine electrics 320 is a hub for the wind-solar electrical energy.

Referring again to FIG. 3, in another embodiment of the present invention, the electrical energy from the DC combiner box 312a is routed to a DC-AC inverter 316. Then, the electrical energy from the DC-AC inverter 316 is routed to the tower electrics 320. In the same embodiment, the electrical energy from the DC-AC inverter 316 may also be directly routed to the wind turbine tower step up transformer 322 (by-passing the tower electrics 320), and then from the wind turbine tower step up transformer 322 to the main wind farm step up transformer 324, and then from the main wind farm step up transformer 324 to the transmission grid 326.

Referring again to FIG. 3, in another embodiment of the present invention, the electrical energy from the solar array 310 is routed to a DC combiner box 312b. The electrical energy from the DC combiner box 312b is then routed to a charge controller 318, and from the charge controller 318 to the wind turbine electrics 320, and from the wind turbine electrics 320 to the wind turbine tower step up transformer 322, and then from the wind turbine tower step up transformer 322, the electrical energy is then routed to the main wind farm step up transformer 324, and from the step up transformer 324 to the transmission grid 326.

I claim:

1. A method for an integrated wind-solar energy system utilizing an existing wind turbine infrastructure, the integrated wind-solar energy system comprising:
   generating wind energy by a wind turbine generator;
   responsive to generating the wind energy, routing the wind energy to turbine tower electrics;
   directing sun light to a solar array, wherein the solar array is permanently mounted on racks in horizontal, or vertical position, or in combination of horizontal and vertical positions;
   routing solar energy form the solar array to a Direct Current (DC) combiner box;
   routing the solar energy form the DC combiner box to a voltage regulator;
   routing the solar energy form the voltage regulator to a turbine tower electrics;
   combining the solar energy with the wind energy in the turbine tower electrics resulting in an integrated wind-solar energy;
   routing the integrated wind-solar energy from the turbine tower electrics to a tower step up transformer; and
   routing the integrated wind-solar energy from the tower step up transformer to a wind farm main step up transformer, and wherein the integrated solar energy system comprises a grounding system for the integrated wind-solar energy system.

2. The method of claim 1, wherein the solar energy form the DC combiner box is routed to a charge controller, and wherein the solar energy from the charge controller is routed to the turbine tower electrics.

3. The method of claim 1, wherein the solar energy form the DC combiner box is routed to a DC-Alternate Current (AC) inverter, and wherein the solar energy from the DC-AC inverter is routed to the turbine tower electrics.

4. The method of claim 1, wherein solar array material includes monocrystalline silicon.

5. The method of claim 1, wherein the solar array is arranged in about nine series circuits of about twelve modules each, wherein the about twelve modules are mounted on a rack, and wherein the rack is directly installed onto a steel support tower.

6. The method of claim 1, wherein the solar array is positioned in the South, or Southwest direction.

7. The method of claim 1, wherein the solar energy is DC, AC, or a combination of both.

8. The method of claim 1, wherein the solar array is mounted on racks, wherein the racks are rotated automatically in accordance with the rotation of the sun for an optimum sun rays angle of incident, wherein the racks are automated to move up or down in accordance with yearly seasons, and wherein the racks include a built-in tilt angle to mount the plurality of solar module-panel arrays.

9. The method of claim 8, wherein the solar array is mounted on racks, wherein the racks are rotated manually in accordance with the rotation of the sun for the optimum sun rays angle of incident, and wherein the racks are manually moved up or down in accordance with yearly seasons.

10. The method of claim 8, wherein the solar array is permanently mounted on the racks, and wherein the racks include a built-in tilt angle to mount the array on the racks.

11. The method of claim 8, wherein the racks are designed to incorporate a tilt angles based on latitude of a wind turbine farm location.

12. The method of claim 1, wherein the integrated wind-solar energy system operates continuously, and wherein the integrated wind-solar energy system operation is unmanned, automated, or manual.

13. The method of claim 1, wherein the integrated wind-solar energy system operation has a capability to be activated or shut down remotely.

14. The method of claim 1, wherein the integrated wind-solar energy system infrastructure includes a wind turbine steel support tower on land, offshore.

15. An apparatus for an integrated wind-solar energy system utilizing an existing wind turbine infrastructure, the integrated wind-solar energy system comprising:
   a wind turbine generator for generating wind turbine energy;
   a wind turbine tower electrics for receiving the generated wind turbine energy;
   sun light directed to a solar array;
   a Direct Current (DC) combiner box for receiving the solar energy form the solar array;
   a voltage regulator for receiving the solar energy form the DC combiner box;
   a turbine tower electrics for receiving the solar energy form the voltage regulator;
   a plurality of DC-AC converter;
   a plurality of capacitors;
   a charge controller;
   a tower step up transformer for receiving the integrated wind-solar energy from the turbine tower electrics;
   a wind farm main step up transformer for receiving the integrated wind-solar energy from the tower step up transformer; and
   a transmission grid for receiving the integrated wind-solar energy from the wind farm main step up transformer.

* * * * *